US012627816B2

(12) United States Patent
Jeong et al.

(10) Patent No.: US 12,627,816 B2
(45) Date of Patent: May 12, 2026

(54) METHOD FOR DECODING IMMERSIVE VIDEO AND METHOD FOR ENCODING IMMERSIVE VIDEO

(71) Applicant: ELECTRONICS AND TELECOMMUNICATIONS RESEARCH INSTITUTE, Daejeon (KR)

(72) Inventors: Jun Young Jeong, Daejeon (KR); Gwang Soon Lee, Daejeon (KR); Dawid Mieloch, Poznań (PL); Adrian Dziembowski, Poznań (PL); Marek Domański, Poznań (PL)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/491,023

(22) Filed: Oct. 20, 2023

(65) Prior Publication Data

US 2024/0137530 A1 Apr. 25, 2024
US 2024/0236339 A9 Jul. 11, 2024

(30) Foreign Application Priority Data

Oct. 24, 2022 (KR) ........................ 10-2022-0137387
Oct. 17, 2023 (KR) ........................ 10-2023-0139033

(51) Int. Cl.
*H04N 7/12* (2006.01)
*G06T 7/50* (2017.01)
(Continued)

(52) U.S. Cl.
CPC ............. *H04N 19/172* (2014.11); *G06T 7/50* (2017.01); *G06V 10/764* (2022.01); *H04N 19/46* (2014.11)

(58) Field of Classification Search
CPC .... H04N 19/172; H04N 19/46; H04N 19/597; H04N 19/70; H04N 13/161;
(Continued)

(56) References Cited

U.S. PATENT DOCUMENTS 11,432,009 B2 * 8/2022 Salahieh ................ H04N 19/59
11,457,199 B2 9/2022 Lee et al.
(Continued)

FOREIGN PATENT DOCUMENTS

WO WO 2022/069809 A1 4/2022

OTHER PUBLICATIONS

Mieloch et al. "Decoder-side depth estimation with extended input depth assistance" *International Organisation for Standardisation, ISO/IEC JTC 1/SC 29/WG 04 m59516*, Apr. 2022 (pp. 1-8).
(Continued)

*Primary Examiner* — Gims S Philippe
(74) *Attorney, Agent, or Firm* — NSIP Law

(57) ABSTRACT

A video encoding method includes classifying a plurality of view images into a basic image and additional images, performing pruning on at least one of the plurality of view images on the basis of the classification result, generating an atlas on the basis of the pruning result, and encoding the atlas and metadata for the atlas. Here, the metadata includes a first flag indicating whether depth estimation needs to be performed on a decoder side.

15 Claims, 8 Drawing Sheets

(51) Int. Cl.

| | | |
|---|---|---|
| *G06V 10/764* | (2022.01) | |
| *H04N 19/172* | (2014.01) | |
| *H04N 19/46* | (2014.01) | |

(58) Field of Classification Search

CPC .. H04N 13/111; H04N 13/128; H04N 13/178; G06T 7/50; G06T 7/593; G06V 10/764

See application file for complete search history.

(56) References Cited

U.S. PATENT DOCUMENTS

| | | | | |
|---|---|---|---|---|
| 11,677,922 B2 * | 6/2023 | Oh | ....................... | H04N 13/161 |
| | | | | 348/43 |
| 2018/0165875 A1 | 6/2018 | Yu et al. | | |
| 2022/0345756 A1 * | 10/2022 | Kroon | ................... | H04N 21/816 |
| 2022/0377302 A1 * | 11/2022 | Fleureau | .............. | H04N 13/161 |
| 2023/0164352 A1 * | 5/2023 | Henry | .................... | H04N 19/85 |
| | | | | 375/240.12 |
| 2023/0247222 A1 * | 8/2023 | Boyce | ................. | G06V 10/764 |
| | | | | 375/240.12 |
| 2024/0129485 A1 * | 4/2024 | Malamal Vadakital | ..................... | |
| | | | | H04N 19/18 |
| 2024/0155100 A1 * | 5/2024 | Kroon | ................. | H04N 19/136 |
| 2024/0292017 A1 * | 8/2024 | Henry | ................. | H04N 19/139 |

OTHER PUBLICATIONS

Dziembowski et al. "[MIV] Extended geometry assistance SEI" *International Organisation for Standardisation, ISO/IEC JTC 1/SC 29/WG 4 m 60248*, Jul. 2022 (pp. 1-10).

Dziembowski et al. "MIV Decoder-Side Depth Estimation profile" *International Organisation for Standardisation, ISO/IEC JTC 1/SC 29/WG 4 m 60667*, Oct. 2022 (pp. 1-10).

* cited by examiner

【FIG. 1】
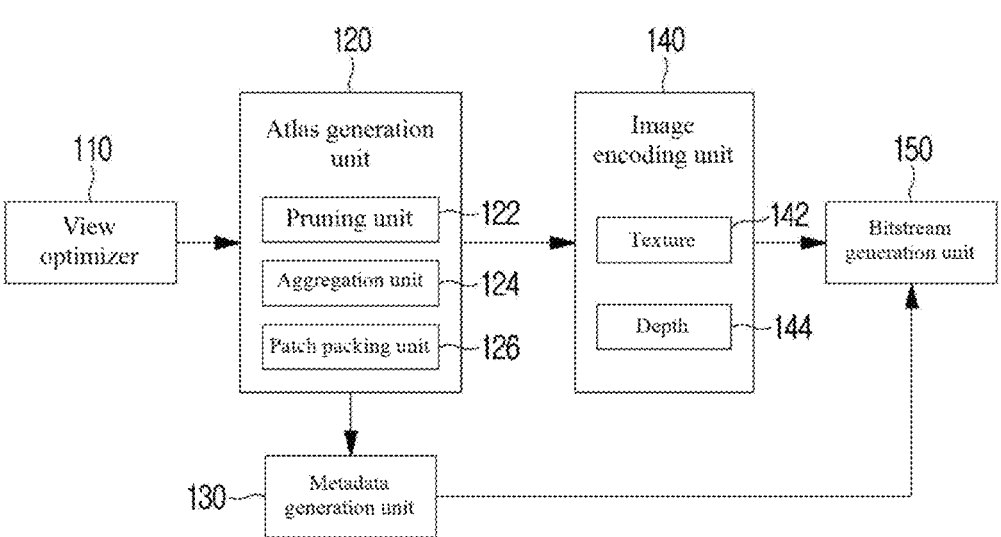

[FIG. 2]
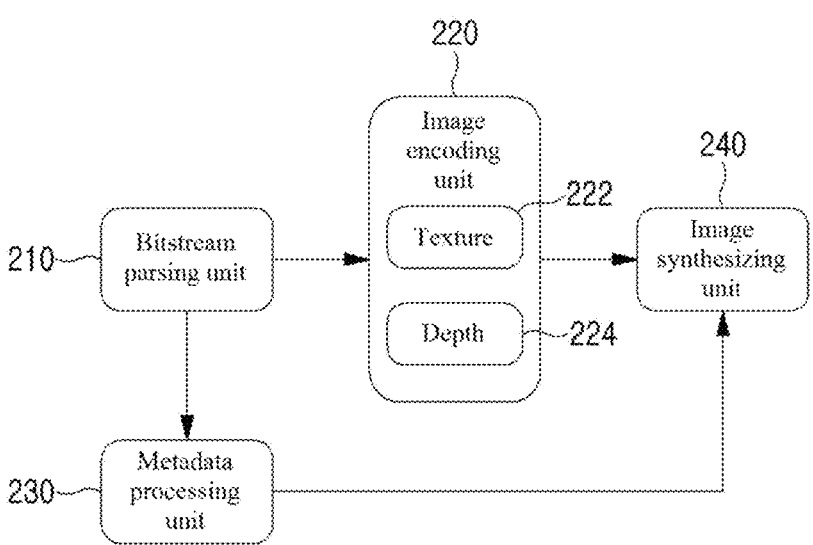

【FIG. 3】
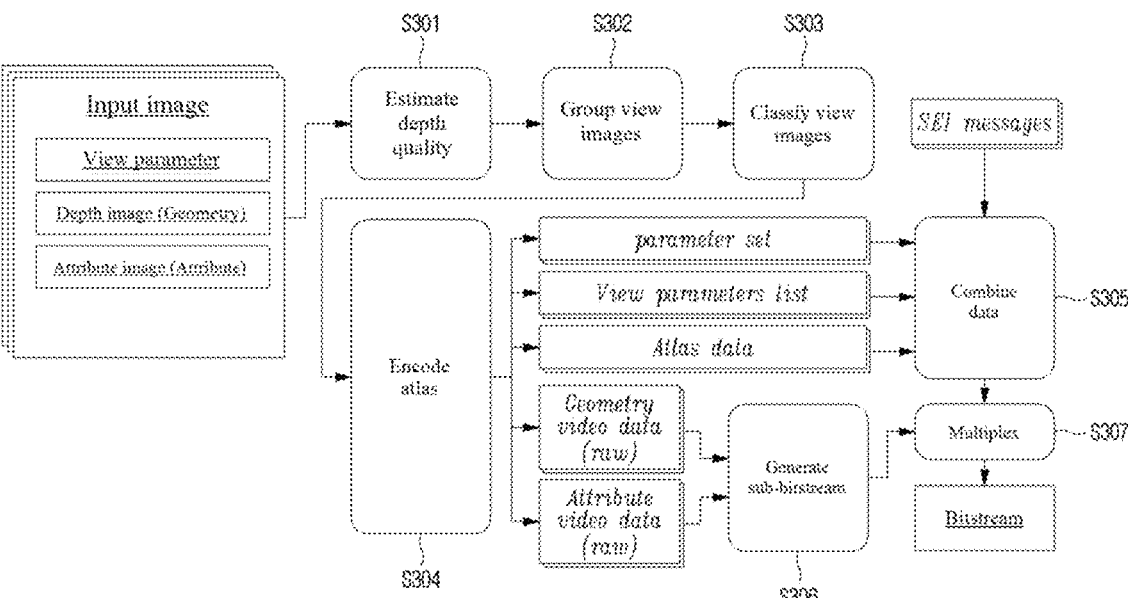

【FIG. 4】
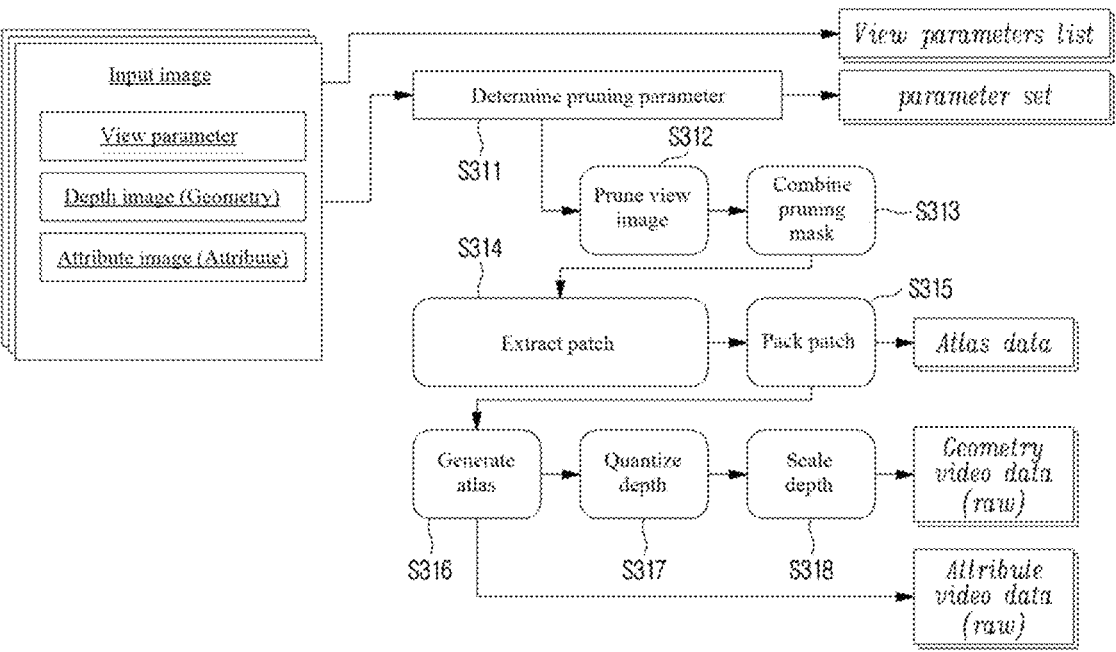

【FIG. 5】
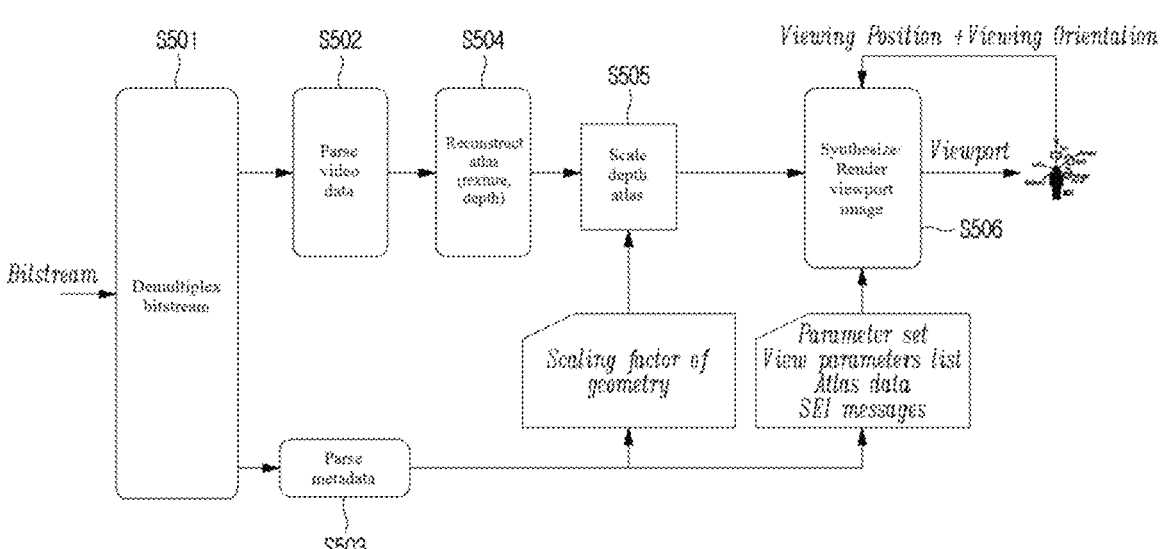

【FIG. 6】
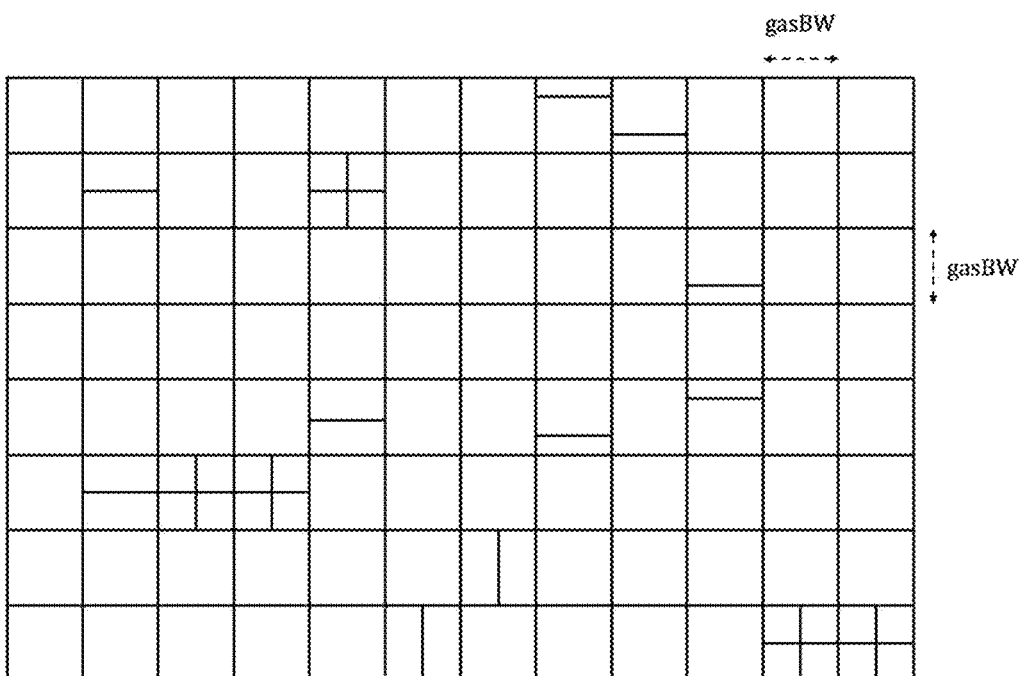

【FIG. 7】

| | | | | | | | | |
|---|---|---|---|---|---|---|---|---|
| bbgf_split_flag | 0 | 1 | 1 | 1 | 1 | 1 | 1 | 1 |
| bbgf_quad_split_flag | - | 1 | 0 | 0 | 0 | 0 | 0 | 0 |
| bbgf_split_orientation_flag | - | - | 0 | 0 | 0 | 1 | 1 | 1 |
| bbgf_split_symmetry_flag | - | - | 1 | 0 | 0 | 1 | 0 | 0 |
| bbgf_split_first_block_bigger | - | - | - | 0 | 1 | - | 0 | 1 |

METHOD FOR DECODING IMMERSIVE VIDEO AND METHOD FOR ENCODING IMMERSIVE VIDEO

CROSS-REFERENCE TO RELATED APPLICATIONS

This application claims the benefit under 35 U.S.C. § 119 (a) of Korean Patent Application Ser. No. 10-2022-0137387 filed on Oct. 24, 2022, and Korean Patent Application No. 10-2023-0139033 filed on Oct. 17, 2023, in the Korean Intellectual Property Office, the entire disclosures of which are incorporated herein by reference for all purposes.

BACKGROUND OF THE INVENTION

Field of the Invention

The present disclosure relates to immersive video encoding/decoding methods for supporting motion parallax for rotational and translational movements.

Description of the Related Art

Virtual reality services are evolving to services for maximizing immersion and realism by generating omnidirectional images in the form of live action video or computer graphics (CG) and playing the same on HMDs, smartphones, etc. Currently, it is known that in order to play natural and immersive omnidirectional videos through HMDs, it is necessary support 6 degrees of freedom (DoF). 6 DoF images need to be provided as free images in six directions such as (1) left and right rotation, (2) up and down rotation, (3) left and right movement, and (4) up and down movement through an HMD screen. However, most omnidirectional images based on live action video only support rotational movement. Accordingly, research in areas such as acquisition and reproduction technology for 6 DoF omnidirectional images is being actively conducted.

SUMMARY OF THE INVENTION

Therefore, the present disclosure has been made in view of the above problems, and it is an object of the present disclosure is to provide a method for performing depth estimation on a decoder side.

It is an object of the present disclosure to provide a profile that allows depth estimation to be performed on the decoder side and a syntax structure according thereto.

The technical objects to be achieved by the present disclosure are not limited to the technical objects mentioned above, and other technical objects not mentioned can be clearly understood by those skilled in the art from the description below.

A video encoding method according to the present disclosure includes classifying a plurality of view images into a basic image and additional images, performing pruning on at least one of the plurality of view images on the basis of the classification result, generating an atlas on the basis of the pruning result, and encoding the atlas and metadata for the atlas. Here, the metadata may include a first flag indicating whether depth estimation needs to be performed on a decoder side.

In the video encoding method according to the present disclosure, the metadata may further include identification information for identifying a profile of a current image, and when the profile of the current image supports depth estimation on the decoder side, the first flag may be encoded into a true value.

In the video encoding method according to the present disclosure, the profile supporting depth estimation on the decoder side may include at least one of GA (Geometry Absent) or MIV DSDE (Decoder-Side Depth Estimation).

In the video encoding method according to the present disclosure, encoding of depth information for the view images may not be allowed when the profile of the current image is the MIV GA, and encoding of depth information for at least some of the view images may be allowed when the profile of the current image is the MIV DSDE.

In the video encoding method according to the present disclosure, the depth information may include a depth atlas.

In the video encoding method according to the present disclosure, the depth atlas may include only information on the basic image among the plurality of view images.

In the video encoding method according to the present disclosure, the metadata may further include a second flag indicating whether depth estimation is performed on all view images.

In the video encoding method according to the present disclosure, the second flag may be encoded into a true value when the profile of the current image is the MIV GA.

In the video encoding method according to the present disclosure, the second flag may be encoded into true or false when the profile of the current image is the MIV DSDE.

A video decoding method according to the present disclosure includes decoding an atlas and metadata for the atlas, and generating a viewport image using the atlas and the metadata. Here, the metadata may include a first flag indicating whether depth estimation needs to be performed on a decoder side.

In the video decoding method according to the present disclosure, the metadata may further include identification information for identifying a profile of a current image, and the profile supporting depth estimation on the decoder side may include at least one of MIV GA (Geometry Absent) or MIV DSDE (Decoder-Side Depth Estimation).

In the video decoding method according to the present disclosure, the value of the first flag may be forced to be true when the profile of the current image is the MIV GA or the MIV DSDE.

In the video decoding method according to the present disclosure, depth information for view images may not be present in a bitstream when the profile of the current image is the MIV GA, whereas depth information for at least some of the view images may be present in the bitstream when the profile of the current image is the MIV DSDE.

In the video decoding method according to the present disclosure, the depth information may include a depth atlas, and the depth atlas may include only information on a basic image among the view images.

In the video decoding method according to the present disclosure, depth map of a first view having depth information present in the bitstream may be obtained by refining a depth map decoded from the depth atlas through motion estimation.

In the video decoding method according to the present disclosure, depth map of a second view having depth information that is not present in the bitstream may be obtained by refining a reprojected depth map generated by reprojecting the depth map of the first view.

In the video decoding method according to the present disclosure, the metadata may further include a second flag indicating whether depth estimation is performed on all view images.

In the video decoding method according to the present disclosure, the second flag may be forced to a true value when the profile of the current image is the MIV GA.

In the video decoding method according to the present disclosure, the second flag may have a true or false value when the profile of the current image is the MIV DSDE.

BRIEF DESCRIPTION OF THE DRAWINGS

FIG. 1 is a block diagram of an immersive video processing device according to an embodiment of the present disclosure.

FIG. 2 is a block diagram of an immersive video output device according to an embodiment of the present disclosure.

FIG. 3 is a flow chart of an immersive video processing method.

FIG. 4 is a flow chart of an atlas encoding process.

FIG. 5 is a flow chart of an immersive video output method.

FIG. 6 shows an example in which one view is divided into a plurality of blocks.

FIG. 7 shows block split forms according to recursive split information of a block.

DETAILED DESCRIPTION OF THE INVENTION

Figure 8:
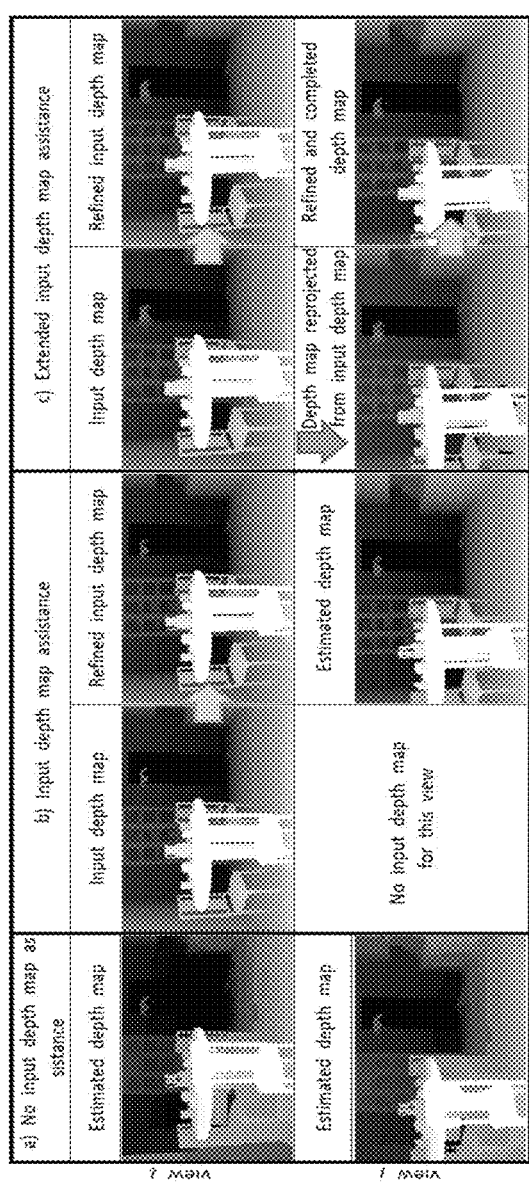
FIG. 8 is a diagram illustrating an example in which a depth map is created/modified through depth estimation.

As the present disclosure may make various changes and have multiple embodiments, specific embodiments are illustrated in a drawing and are described in detail in a detailed description. But, it is not to limit the present disclosure to a specific embodiment, and should be understood as including all changes, equivalents and substitutes included in an idea and a technical scope of the present disclosure. A similar reference numeral in a drawing refers to a like or similar function across multiple aspects. A shape and a size, etc. of elements in a drawing may be exaggerated for a clearer description. A detailed description on exemplary embodiments described below refers to an accompanying drawing which shows a specific embodiment as an example. These embodiments are described in detail so that those skilled in the pertinent art can implement an embodiment. It should be understood that a variety of embodiments are different each other, but they do not need to be mutually exclusive. For example, a specific shape, structure and characteristic described herein may be implemented in other embodiment without departing from a scope and a spirit of the present disclosure in connection with an embodiment. In addition, it should be understood that a position or an arrangement of an individual element in each disclosed embodiment may be changed without departing from a scope and a spirit of an embodiment. Accordingly, a detailed description described below is not taken as a limited meaning and a scope of exemplary embodiments, if properly described, are limited only by an accompanying claim along with any scope equivalent to that claimed by those claims.

In the present disclosure, a term such as first, second, etc. may be used to describe a variety of elements, but the elements should not be limited by the terms. The terms are used only to distinguish one element from other element. For example, without getting out of a scope of a right of the present disclosure, a first element may be referred to as a second element and likewise, a second element may be also referred to as a first element. A term of and/or includes a combination of a plurality of relevant described items or any item of a plurality of relevant described items.

When an element in the present disclosure is referred to as being "connected" or "linked" to another element, it should be understood that it may be directly connected or linked to that another element, but there may be another element between them. Meanwhile, when an element is referred to as being "directly connected" or "directly linked" to another element, it should be understood that there is no another element between them.

As construction units shown in an embodiment of the present disclosure are independently shown to represent different characteristic functions, it does not mean that each construction unit is composed in a construction unit of separate hardware or one software. In other words, as each construction unit is included by being enumerated as each construction unit for convenience of a description, at least two construction units of each construction unit may be combined to form one construction unit or one construction unit may be divided into a plurality of construction units to perform a function, and an integrated embodiment and a separate embodiment of each construction unit are also included in a scope of a right of the present disclosure unless they are beyond the essence of the present disclosure.

A term used in the present disclosure is just used to describe a specific embodiment, and is not intended to limit the present disclosure. A singular expression, unless the context clearly indicates otherwise, includes a plural expression. In the present disclosure, it should be understood that a term such as "include" or "have", etc. is just intended to designate the presence of a feature, a number, a step, an operation, an element, a part or a combination thereof described in the present specification, and it does not exclude in advance a possibility of presence or addition of one or more other features, numbers, steps, operations, elements, parts or their combinations. In other words, a description of "including" a specific configuration in the present disclosure does not exclude a configuration other than a corresponding configuration, and it means that an additional configuration may be included in a scope of a technical idea of the present disclosure or an embodiment of the present disclosure.

Some elements of the present disclosure are not a necessary element which performs an essential function in the present disclosure and may be an optional element for just improving performance. The present disclosure may be implemented by including only a construction unit which is necessary to implement essence of the present disclosure except for an element used just for performance improvement, and a structure including only a necessary element except for an optional element used just for performance improvement is also included in a scope of a right of the present disclosure.

Hereinafter, an embodiment of the present disclosure is described in detail by referring to a drawing. In describing an embodiment of the present specification, when it is determined that a detailed description on a relevant disclosed configuration or function may obscure a gist of the present specification, such a detailed description is omitted, and the same reference numeral is used for the same element in a drawing and an overlapping description on the same element is omitted.

An immersive video, when a user's viewing position is changed, refers to a video that a viewport image may be also dynamically changed. In order to implement an immersive video, a plurality of input images are required. Each of a plurality of input images may be referred to as a source image or a view image. A different view index may be assigned to each view image. An immersive image may be composed of images each of which has different view, thus, the immersive video can also be referred to as multi-view image.

An immersive video may be classified into 3DoF (Degree of Freedom), 3DoF+, Windowed-6DoF or 6DoF type, etc. A 3DoF-based immersive video may be implemented by using only a texture image. On the other hand, in order to render an immersive video including depth information such as 3DoF+ or 6DoF, etc., a depth image (or, a depth map) as well as a texture image is also required.

It is assumed that embodiments described below are for immersive video processing including depth information such as 3DoF+ and/or 6DoF, etc. In addition, it is assumed that a view image is configured with a texture image and a depth image.

FIG. 1 is a block diagram of an immersive video processing device according to an embodiment of the present disclosure.

In reference to FIG. 1, an immersive video processing device according to the present disclosure may include a view optimizer 110, an atlas generation unit 120, a metadata generation unit 130, an image encoding unit 140 and a bitstream generation unit 150.

An immersive video processing device receives a plurality of pairs of images, a camera intrinsic parameters and a camera extrinsic parameter as an input data to encode an immersive video. Here, a plurality of pairs of images include a texture image (Attribute component) and a depth image (Geometry component). Each pair may have a different view. Accordingly, a pair of input images may be referred to as a view image. Each of view images may be divided by an index. In this case, an index assigned to each view image may be referred to as a view or a view index.

A camera intrinsic parameters includes a focal distance, a position of a principal point, etc. and a camera extrinsic parameters includes translations, rotations, etc. of a camera. A camera intrinsic parameters and a camera extrinsic parameters may be treated as a camera parameter or a view parameter.

A view optimizer 110 partitions view images into a plurality of groups. As view images are partitioned into a plurality of groups, independent encoding processing per each group may be performed. In an example, view images captured by N spatially consecutive cameras may be classified into one group. Thereby, view images that depth information is relatively coherent may be put in one group and accordingly, rendering quality may be improved.

In addition, by removing dependence of information between groups, a spatial random access service which performs rendering by selectively bringing only information in a region that a user is watching may be made available.

Whether view images will be partitioned into a plurality of groups may be optional.

In addition, a view optimizer 110 may classify view images into a basic image and an additional image. A basic image represents an image which is not pruned as a view image with a highest pruning priority and an additional image represents a view image with a pruning priority lower than a basic image.

A view optimizer 110 may determine at least one of view images as a basic image. A view image which is not selected as a basic image may be classified as an additional image.

A view optimizer 110 may determine a basic image by considering a view position of a view image. In an example, a view image whose view position is the center among a plurality of view images may be selected as a basic image.

Alternatively, a view optimizer 110 may select a basic image based on camera parameters. Specifically, a view optimizer 110 may select a basic image based on at least one of a camera index, a priority between cameras, a position of a camera or whether it is a camera in a region of interest.

In an example, at least one of a view image with a smallest camera index, a view image with a largest camera index, a view image with the same camera index as a predefined value, a view image captured by a camera with a highest priority, a view image captured by a camera with a lowest priority, a view image captured by a camera at a predefined position (e.g., a central position) or a view image captured by a camera in a region of interest may be determined as a basic image.

Alternatively, a view optimizer 110 may determine a basic image based on quality of view images. In an example, a view image with highest quality among view images may be determined as a basic image.

Alternatively, a view optimizer 110 may determine a basic image by considering an overlapping data rate of other view images after inspecting a degree of data redundancy between view images. In an example, a view image with a highest overlapping data rate with other view images or a view image with a lowest overlapping data rate with other view images may be determined as a basic image.

A plurality of view images may be also configured as a basic image.

An Atlas generation unit 120 performs pruning and generates a pruning mask. And, it extracts a patch by using a pruning mask and generates an atlas by combining a basic image and/or an extracted patch. When view images are partitioned into a plurality of groups, the process may be performed independently per each group.

A generated atlas may be composed of a texture atlas and a depth atlas. A texture atlas represents a basic texture image and/or an image that texture patches are combined and a depth atlas represents a basic depth image and/or an image that depth patches are combined.

An atlas generation unit 120 may include a pruning unit 122, an aggregation unit 124 and a patch packing unit 126.

A pruning unit 122 performs pruning for an additional image based on a pruning priority. Specifically, pruning for an additional image may be performed by using a reference image with a higher pruning priority than an additional image.

A reference image includes a basic image. In addition, according to a pruning priority of an additional image, a reference image may further include other additional image.

Whether an additional image may be used as a reference image may be selectively determined. In an example, when an additional image is configured not to be used as a reference image, only a basic image may be configured as a reference image.

On the other hand, when an additional image is configured to be used as a reference image, a basic image and other additional image with a higher pruning priority than an additional image may be configured as a reference image.

Through a pruning process, redundant data between an additional image and a reference image may be removed. Specifically, through a warping process based on a depth image, data overlapped with a reference image may be removed in an additional image. In an example, when a depth value between an additional image and a reference image is compared and that difference is equal to or less than a threshold value, it may be determined that a corresponding pixel is redundant data.

As a result of pruning, a pruning mask including information on whether each pixel in an additional image is valid or invalid may be generated. A pruning mask may be a binary image which represents whether each pixel in an additional image is valid or invalid. In an example, in a pruning mask, a pixel determined as overlapping data with a reference image may have a value of 0 and a pixel determined as non-overlapping data with a reference image may have a value of 1.

While a non-overlapping region may have a non-square shape, a patch is limited to a square shape. Accordingly, a patch may include an invalid region as well as a valid region. Here, a valid region refers to a region composed of non-overlapping pixels between an additional image and a reference image. In other words, a valid region represents a region that includes data which is included in an additional image, but is not included in a reference image. An invalid region refers to a region composed of overlapping pixels between an additional image and a reference image. A pixel/data included by a valid region may be referred to as a valid pixel/valid data and a pixel/data included by an invalid region may be referred to as an invalid pixel/invalid data.

An aggregation unit 124 combines a pruning mask generated in a frame unit in an intra-period unit.

In addition, an aggregation unit 124 may extract a patch from a combined pruning mask image through a clustering process. Specifically, a square region including valid data in a combined pruning mask image may be extracted as a patch. Regardless of a shape of a valid region, a patch is extracted in a square shape, so a patch extracted from a square valid region may include invalid data as well as valid data.

In this case, an aggregation unit 124 may repartition a L-shaped or C-shaped patch which reduces encoding efficiency. Here, a L-shaped patch represents that distribution of a valid region is L-shaped and a C-shaped patch represents that distribution of a valid region is C-shaped.

When distribution of a valid region is L-shaped or C-shaped, a region occupied by an invalid region in a patch is relatively large. Accordingly, a L-shaped or C-shaped patch may be partitioned into a plurality of patches to improve encoding efficiency.

For an unpruned view image, a whole view image may be treated as one patch. Specifically, a whole 2D image which develops an unpruned view image in a predetermined projection format may be treated as one patch. A projection format may include at least one of an Equirectangular Projection Format (ERP), a Cube-map or a Perspective Projection Format.

Here, an unpruned view image refers to a basic image with a highest pruning priority. Alternatively, an additional image that there is no overlapping data with a reference image and a basic image may be defined as an unpruned view image. Alternatively, regardless of whether there is overlapping data with a reference image, an additional image arbitrarily excluded from a pruning target may be also defined as an unpruned view image. In other words, even an additional image that there is data overlapping with a reference image may be defined as an unpruned view image.

A packing unit 126 packs a patch in a rectangle image. In patch packing, deformation such as size transform, rotation, or flip, etc. of a patch may be accompanied. An image that patches are packed may be defined as an atlas.

Specifically, a packing unit 126 may generate a texture atlas by packing a basic texture image and/or texture patches and may generate a depth atlas by packing a basic depth image and/or depth patches.

For a basic image, a whole basic image may be treated as one patch. In other words, a basic image may be packed in an atlas as it is. When a whole image is treated as one patch, a corresponding patch may be referred to as a complete image (complete view) or a complete patch.

The number of atlases generated by an atlas generation unit 120 may be determined based on at least one of an arrangement structure of a camera rig, accuracy of a depth map or the number of view images.

A metadata generation unit 130 generates metadata for image synthesis. Metadata may include at least one of camera-related data, pruning-related data, atlas-related data or patch-related data.

Pruning-related data includes information for determining a pruning priority between view images. In an example, at least one of a flag representing whether a view image is a root node or a flag representing whether a view image is a leaf node may be encoded. A root node represents a view image with a highest pruning priority (i.e., a basic image) and a leaf node represents a view image with a lowest pruning priority.

When a view image is not a root node, a parent node index may be additionally encoded. A parent node index may represent an image index of a view image, a parent node.

Alternatively, when a view image is not a leaf node, a child node index may be additionally encoded. A child node index may represent an image index of a view image, a child node.

Atlas-related data may include at least one of size information of an atlas, number information of an atlas, priority information between atlases or a flag representing whether an atlas includes a complete image. A size of an atlas may include at least one of size information of a texture atlas and size information of a depth atlas. In this case, a flag representing whether a size of a depth atlas is the same as that of a texture atlas may be additionally encoded. When a size of a depth atlas is different from that of a texture atlas, reduction ratio information of a depth atlas (e.g., scaling-related information) may be additionally encoded. Atlas-related information may be included in a "View parameters list" item in a bitstream.

In an example, geometry_scale_enabled_flag, a syntax representing whether it is allowed to reduce a depth atlas, may be encoded/decoded. When a value of a syntax geometry_scale_enabled_flag is 0, it represents that it is not allowed to reduce a depth atlas. In this case, a depth atlas has the same size as a texture atlas.

When a value of a syntax geometry_scale_enabled_flag is 1, it represents that it is allowed to reduce a depth atlas. In this case, information for determining a reduction ratio of a depth atlas may be additionally encoded/decoded. In an example, geometry_scaling_factor_x, a syntax representing a horizontal directional reduction ratio of a depth atlas, and geometry_scaling_factor_y, a syntax representing a vertical directional reduction ratio of a depth atlas, may be additionally encoded/decoded.

An immersive video output device may restore a reduced depth atlas to its original size after decoding information on a reduction ratio of a depth atlas.

Patch-related data includes information for specifying a position and/or a size of a patch in an atlas image, a view image to which a patch belongs and a position and/or a size of a patch in a view image. In an example, at least one of position information representing a position of a patch in an atlas image or size information representing a size of a patch in an atlas image may be encoded. In addition, a source index for identifying a view image from which a patch is derived may be encoded. A source index represents an index of a view image, an original source of a patch. In addition, position information representing a position corresponding to a patch in a view image or position information representing a size corresponding to a patch in a view image may be encoded. Patch-related information may be included in an "Atlas data" item in a bitstream.

An image encoding unit 140 encodes an atlas. When view images are classified into a plurality of groups, an atlas may be generated per group. Accordingly, image encoding may be performed independently per group.

An image encoding unit 140 may include a texture image encoding unit 142 encoding a texture atlas and a depth image encoding unit 144 encoding a depth atlas.

A bitstream generation unit 150 generates a bitstream based on encoded image data and metadata. A generated bitstream may be transmitted to an immersive video output device.

FIG. 2 is a block diagram of an immersive video output device according to an embodiment of the present disclosure.

In reference to FIG. 2, an immersive video output device according to the present disclosure may include a bitstream parsing unit 210, an image decoding unit 220, a metadata processing unit 230 and an image synthesizing unit 240.

A bitstream parsing unit 210 parses image data and metadata from a bitstream. Image data may include data of an encoded atlas. When a spatial random access service is supported, only a partial bitstream including a watching position of a user may be received.

An image decoding unit 220 decodes parsed image data. An image decoding unit 220 may include a texture image decoding unit 222 for decoding a texture atlas and a depth image decoding unit 224 for decoding a depth atlas.

A metadata processing unit 230 unformats parsed metadata.

Unformatted metadata may be used to synthesize a specific view image. In an example, when motion information of a user is input to an immersive video output device, a metadata processing unit 230 may determine an atlas necessary for image synthesis and patches necessary for image synthesis and/or a position/a size of the patches in an atlas and others to reproduce a viewport image according to a user's motion.

An image synthesizing unit 240 may dynamically synthesize a viewport image according to a user's motion. Specifically, an image synthesizing unit 240 may extract patches required to synthesize a viewport image from an atlas by using information determined in a metadata processing unit 230 according to a user's motion. Specifically, a viewport image may be generated by extracting patches extracted from an atlas including information of a view image required to synthesize a viewport image and the view image in the atlas and synthesizing extracted patches.

FIGS. 3 and 5 show a flow chart of an immersive video processing method and an immersive video output method, respectively.

In the following flow charts, what is italicized or underlined represents input or output data for performing each step. In addition, in the following flow charts, an arrow represents processing order of each step. In this case, steps without an arrow indicate that temporal order between corresponding steps is not determined or that corresponding steps may be processed in parallel. In addition, it is also possible to process or output an immersive video in order different from that shown in the following flow charts.

An immersive video processing device may receive at least one of a plurality of input images, a camera internal variable and a camera external variable and evaluate depth map quality through input data S301. Here, an input image may be configured with a pair of a texture image (Attribute component) and a depth image (Geometry component).

An immersive video processing device may classify input images into a plurality of groups based on positional proximity of a plurality of cameras S302. By classifying input images into a plurality of groups, pruning and encoding may be performed independently between adjacent cameras whose depth value is relatively coherent. In addition, through the process, a spatial random access service that rendering is performed by using only information of a region a user is watching may be enabled.

But, the above-described S301 and S302 are just an optional procedure and this process is not necessarily performed.

When input images are classified into a plurality of groups, procedures which will be described below may be performed independently per group.

An immersive video processing device may determine a pruning priority of view images S303. Specifically, view images may be classified into a basic image and an additional image and a pruning priority between additional images may be configured.

Subsequently, based on a pruning priority, an atlas may be generated and a generated atlas may be encoded S304. A process of encoding atlases is shown in detail in FIG. 4.

Specifically, a pruning parameter (e.g., a pruning priority, etc.) may be determined S311 and based on a determined pruning parameter, pruning may be performed for view images S312. As a result of pruning, a basic image with a highest priority is maintained as it is originally. On the other hand, through pruning for an additional image, overlapping data between an additional image and a reference image is removed. Through a warping process based on a depth image, overlapping data between an additional image and a reference image may be removed.

As a result of pruning, a pruning mask may be generated. If a pruning mask is generated, a pruning mask is combined in a unit of an intra-period S313. And, a patch may be extracted from a texture image and a depth image by using a combined pruning mask S314. Specifically, a combined pruning mask may be masked to texture images and depth images to extract a patch.

In this case, for an non-pruned view image (e.g., a basic image), a whole view image may be treated as one patch.

Subsequently, extracted patches may be packed S315 and an atlas may be generated S316. Specifically, a texture atlas and a depth atlas may be generated.

In addition, an immersive video processing device may determine a threshold value for determining whether a pixel is valid or invalid based on a depth atlas S317. In an example, a pixel that a value in an atlas is smaller than a threshold value may correspond to an invalid pixel and a pixel that a value is equal to or greater than a threshold value may correspond to a valid pixel. A threshold value may be determined in a unit of an image or may be determined in a unit of a patch.

For reducing the amount of data, a size of a depth atlas may be reduced by a specific ratio S318. When a size of a depth atlas is reduced, information on a reduction ratio of a depth atlas (e.g., a scaling factor) may be encoded. In an immersive video output device, a reduced depth atlas may be restored to its original size through a scaling factor and a size of a texture atlas.

Metadata generated in an atlas encoding process (e.g., a parameter set, a view parameter list or atlas data, etc.) and SEI (Supplemental Enhancement Information) are combined S305. In addition, a sub bitstream may be generated by encoding a texture atlas and a depth atlas respectively S306. And, a single bitstream may be generated by multiplexing encoded metadata and an encoded atlas S307.

An immersive video output device demultiplexes a bitstream received from an immersive video processing device S501. As a result, video data, i.e., atlas data and metadata may be extracted respectively S502 and S503.

An immersive video output device may restore an atlas based on parsed video data S504. In this case, when a depth atlas is reduced at a specific ratio, a depth atlas may be scaled to its original size by acquiring related information from metadata S505.

When a user's motion occurs, based on metadata, an atlas required to synthesize a viewport image according to a user's motion may be determined and patches included in the atlas may be extracted. A viewport image may be generated and rendered S506. In this case, in order to synthesize viewpoint image with the patches, size/position information of each patch and a camera parameter, etc. may be used.

A value derived by taking the reciprocal of the distance m between a camera and an object can be normalized and normalized disparity values can be mapped to depth values. Specifically, the reciprocal of the distance can be defined as disparity represented in metric units (1/m). Normalized disparity can be represented as a value (e.g., a geometric value) in a pixel range that can be represented by a pixel in a geometric image. Here, a normalized disparity value mapped to the maximum value in the pixel range can be defined as a normalized maximum disparity value, and a normalized disparity value mapped to the minimum value in the pixel range can be defined as a normalized minimum disparity value. For example, in an N-bit image, a normalized disparity value mapped to a pixel value 2N−1 may be defined as the normalized maximum disparity value, and a normalized disparity value mapped to a pixel value 0 may be defined as the normalized minimum disparity value.

Equation 1 shows an example of converting a normalized disparity value in metric units (1/m) into each pixel value in a geometric image.

$$\text{SampleValue} = (\text{NormDisparity} - \text{NormDispMin}) / (\text{NormDispMax} - \text{NormDispMin}) * \text{MaxSampleValue} \qquad \text{[Equation 1]}$$

In Equation 1, SampleValue represents a pixel value (i.e., geometric value) in a depth map, and NormDisparity represents a normalized disparity value in metric units (1/m). NormDispMin represents a normalized minimum disparity value, and NormDispMax represents a normalized maximum disparity value. MaxSmapleValue represents a maximum pixel range that can be expressed by one pixel. As an example, for an N-bit image, MaxSampleValue may be set to 2N−1. Here, the depth map represents a picture (frame) composed of geometric information and, as an example, can represent a geometric atlas. By encoding and transmitting the depth map, a restored image can be rendered in a 3D space in an immersive video output device.

A geometry range can be defined as a range between the minimum value and the maximum value in the depth map. Geometric values may be quantized and encoded/decoded. In this case, the geometry range may be defined as a range between minimum and maximum values among the quantized geometric values.

Meanwhile, it is possible to estimate geometric information in a decoder instead of explicitly encoding and transmitting the geometric information in an encoder. Here, the encoder may correspond to or be included in the immersive video processing device of FIG. 1, and the decoder may correspond to or be included in the immersive video output device of FIG. 2.

When the decoder performs geometry estimation, encoding/decoding of geometric values, that is, geometric atlas, can be skipped. However, auxiliary information used for the decoder to perform depth estimation may be transmitted through an SEI message. In the SEI message, at least one piece of information for reducing the range of available depth levels that can be considered in each block of the depth map, information indicating whether depth estimation can be skipped in a block, or information indicating whether it is possible to copy a geometric value from a previous frame and apply the same to a static area may be encoded.

Depending on the type of auxiliary information transmitted through the SEI message, whether or not to support recursive splitting of blocks may be determined. For example, a geometry assistance (GA) SEI message may not include information on recursive splitting of blocks. That is, in a case where the GA SEI message is transmitted, depth estimation can be performed with the same block size. On the other hand, an extended GA (EGA) SEI message may include information on recursive splitting of blocks. In a case where the EGA SEI message is transmitted, depth estimation may be performed for each leaf node block generated as a result of recursive splitting.

The EGA SEI message and the GA SEI message may include geometry assistance information in common. The geometry assistance information will be described in detail using Table 2 which will be described later.

The EGA SEI message may further include information on a geometry assistance type with respect to the GA SEI message. This will be described in detail using Table 1.

Table 1 shows a syntax structure for a geometry assistance type included in the EGA SEI message according to an embodiment of the present disclosure.

TABLE 1

|  | Descriptor |
|---|---|
| extended_geometry_assistance( payloadSize ) { | |
|   ega_num_of_available_asssistance_types_minus1 | u(4) |
|   for( v = 0; v <= mvp_num_views_minus1; v++ ) { | |
|     ega_assistance_present_flag[ v ] | u(1) |
|     if( ega_assistance_present_flag[ v ] == 1 ) { | |
|       for( t = 0; t <= ega_num_of_asssistance_types_minus1; t++ ) { | |
|         ega_assistance_type_present_flag [ v ][ t ] | u(1) |
|       } | |
|       if( ega_assistance_type_present_flag[ v ][ 0 ] == 1) { | |
|         block_based_geometry_features( v ) | |
|       } | |
|       if(ega_assistance_type_present_flag[ v ][ 1 ] == 1) { | |
|         //something else, up to 16 types | |
|       } | |

TABLE 1-continued

| | Descriptor |
|---|---|
| } | |
| } | |
| } | |

The EGA SEI message may include at least one of information on the number of available assistance, information indicating whether there is geometry assistance information for each view, or information indicating an assistance type for each view.

As an example, in Table 1, the syntax ega_num_of_available_asssistance_types_minus1 indicates the number of available assistance types for each view. As an example, the value obtained by adding 1 to the value indicated by the syntax ega_num_of_available_asssistance_types_minus1 can indicate the number of available assistance types. A maximum of 16 assistance types can be set.

The syntax ega_assistance_present_flag[v] indicates whether there is geometry assistance information for a view with an index v. As an example, when the value of the syntax ega_assistance_present_flag[v] is 1, this indicates that geometry assistance information is present for the view with the index v. On the other hand, when the value of the syntax ega_assistance_present_flag[v] is 0, this indicates that geometry assistance information is not present for the view with the index v.

When the syntax ega_assistance_present_flag[v] for the view with the index v is 1, the syntax ega_assistance_type_present_flag[v][t] may be additionally encoded/decoded. The syntax ega_assistance_type_present_flag[v][t] indicates whether there is geometry assistance information on the type corresponding to an index t for the view with the index v. As an example, when the syntax ega_assistance_type_present_flag[v][t] is 1, this indicates that the geometry assistance information on the type corresponding to the index t is present for the view with the index v. On the other hand, when the syntax ega_assistance_type_present_flag[v][t] is 0, this indicates that the geometry assistance information on the type corresponding to the index t is not present for the view with the index v.

For each type, the syntax ega_assistance_type_present_flag[v][t] may be encoded and signaled. When the syntax ega_assistance_type_present_flag[v][t] is 1, encoding/decoding of ega_assistance_type_present_flag[v][t] may be skipped for types with indices greater than t.

Additionally, for the last type, encoding/decoding of the syntax ega_assistance_type_present_flag[v][t] may be skipped. That is, if the value of the syntax ega_assistance_type_present_flag[v][t] for the remaining types excluding the last type is 0, the value of the syntax ega_assistance_type_present_flag[v][t] for the last type can be inferred to be 1.

Instead of encoding/decoding the syntax ega_assistance_type_present_flag[v][t] for each type, an index indicating one of a plurality of types may be encoded/decoded. As an example, the syntax ega_assitance_type_idx[v] indicates the type of geometry assistance information corresponding to the view with the index v.

Geometry assistance information may be encoded/decoded for each view. Here, depending on the type of geometry assistance information, the assistance unit of geometry information may be set differently. For example, depending on geometry assistance information type, the assistance unit of geometry information may be determined as a block unit, a slice unit, a tile unit, a picture unit, or a GOP unit.

Table 2 shows an example of a syntax structure for geometry assistance information when the assistance unit of geometry information is a block unit. In embodiments which will be described later, a current block represents a basic block, a block for which a split structure is determined among blocks generated by splitting the basic block, or a block for which geometry estimation information is encoded/decoded.

TABLE 2

| | Descriptor |
|---|---|
| block_based_geometry_features( v ) { | |
|   bbgf_qs [ v ] | ue(v) |
|   bbgf_log2_bw_minus2 [ v ] | ue(v) |
|   bbgf_max_number_of_splits [ v ] | ue(v) |
|   gasBw = 1 << ( bbgf_log2_bw_minus2 + 2 ) | |
|   bbgf_projection_plane_height_minus1[ v ] | ue(v) |
|   bbgf_projection_plane_width_minus1[ v ] | ue(v) |
|   for( l = 0; l < ( bbgf_projection_plane_height_minus1[ v ] + gasBW ) /gasBW; l++ ) { | |
|     for( c = 0; c < ( bbgf_projection_plane_width_minus1[ v ] + gasBW ) / gasBW; c++ ) { | |
|       recursiveSplitFunction( l, c, 0 ) | |
|     } | |
|   } | |
| } | |
| recursiveSplitFunction( sbl, sbc, lvl ) { | |
|   if ( lvl < bbgf_max_number_of_splits ) { | |
|     bbgf_split_flag | u(1) |
|   } | |
|   if( lvl < bbgf_max_number_of_splits && bbgf_split_flag ) { | |
|     bbgf_quad_split_flag | u(1) |
|     if( bbgf_quad_split_flag ) { | |
|       recursiveSplitFunction( sbl, sbc, lvl + 1 ) | |
|       recursiveSplitFunction( sbl, sbc + 1, lvl + 1 ) | |
|       recursiveSplitFunction( sbl + 1, sbc, lvl + 1 ) | |
|       recursiveSplitFunction( sbl + 1, sbc + 1, lvl + 1 ) | |
|     } else { | |
|       bbgf_split_orientation_flag | u(1) |

TABLE 2-continued

| | Descriptor |
|---|---|
| bbgf_split_symmetry_flag | u(1) |
| if( !bbgf_split_symmetry_flag ) { | |
|   bbgf_split_first_block_bigger | u(1) |
| } | |
| if( bbgf_split_orientation_flag ) { | |
|   recursiveSplitFunction( sbl, sbc, lvl + 1) | |
|   recursiveSplitFunction( sbl, sbc + 1, lvl + 1) | |
| } else { | |
|   recursiveSplitFunction( sbl, sbc, lvl + 1) | |
|   recursiveSplitFunction( sbl + 1, sbc, lvl + 1) | |
| } | |
| } | |
| } else { | |
|   bbgf_skip_flag | u(1) |
|   if( !bbgf_skip_flag ) { | |
|     if ( sbl == 0 && sbc == 0 ) { /*None*/ | |
|       LTMinFlag = 2 | |
|       LTMaxFlag = 2 | |
|     } else if( sbl == 0 ) { /*Left*/ | |
|       LTMinFlag = 0 | |
|       LTMaxFlag = 0 | |
|     } else if( sbc == 0 ) { /*Top*/ | |
|       LTMinFlag = 1 | |
|       LTMaxFlag = 1 | |
|     } else { | |
|       bbgf_ltmin_flag | u(1) |
|       bbgf_ltmax_flag | u(1) |
|       LTMinFlag = bbgf_ltmin_flag | |
|       LTMaxFlag = bbgf_ltmax_flag | |
|     } | |
|     bbgf_zmin_delta | se(v) |
|     bbgf_zmax delta | se(v) |
|   } | |
| } | |
| } | |

In Table 2, the syntax bbgf_qs[v] indicates a quantization parameter (or quantization step) for the view with the index v. The quantization parameter may be used to quantize a geometric information difference value, which will be described later.

To estimate a geometry range on a block basis, one view (i.e., frame) can be split into a plurality of blocks.

FIG. 6 shows an example in which one view is split into a plurality of blocks.

In splitting one view into a plurality of blocks, the upper left corner of the first block among the plurality of basic blocks of one view may coincide with the position of the upper left corner of a picture.

The basic block may be a square block having a size predefined in the encoder and the decoder. Alternatively, information indicating the size of the basic block may be explicitly encoded and signaled. As an example, information indicating a value obtained by applying the Log_2 function to the width, height, or size (e.g., width×height) of the basic block or a value obtained by subtracting an offset (e.g., 1 or 2) from the value may be explicitly encoded and signaled. As an example, in Table 2, the syntax bbgf_log2_bw_minus2[v] indicates the size of the basic block for the view with the index v. As an example, a variable bbgfBW representing the size of the basic block may be derived by Equation 2 below.

$$\text{bbgfBW}=1<<(\text{bbgf\_log2\_bw\_minus2}+2) \qquad \text{[Equation 2]}$$

In FIG. 6, it is assumed that the basic block has a square shape in which both the width and height are bbgfBW.

Meanwhile, in order to split one view into basic blocks having a uniform size, information related to a frame size can be encoded/decoded. As an example, in Table 2, the syntax bbgf_projection_plane_width_minus1[v] and the syntax bbgf_projection_plane_height_minus1[v] indicate horizontal resolution and vertical resolution in luma sample units on a projection plane to which geometry assistance information is signaled. Here, each of the above two syntaxes may indicate the size of a basic block unit. That is, the horizontal resolution (i.e., width) of a frame can be set to a value obtained by multiplying a value obtained by adding 1 to the syntax bbgf_projection_plane_width_minus1[v] by the width of the basic block, and the vertical resolution (i.e., height) of the frame can be set to a value obtained by multiplying the value obtained adding 1 to the syntax bbgf_projection_plane_height_minus1[v] by the height of the basic block.

Each basic block can be recursively split into smaller blocks. Here, a leaf node block within a basic block may be a square block or a non-square block. Here, the leaf node block represents a block that is no longer split.

For this purpose, information for supporting a block recursive split structure can be encoded/decoded. As an example, in Table 2, the syntax bbgf_split_flag indicates whether the current block is split. When the value of syntax bbgf_split_flag is 1, this indicates that the current block is split into smaller subblocks, and when the value of syntax bbgf_split_flag is 0, this indicates that the current block is no longer split.

If it is determined to split the current block, the syntax bbgf_quad_split_flag may be additionally encoded/decoded. The syntax bbgf_quad_split_flag indicates whether the current block is split into 4 subblocks or 2 subblocks. As an example, when the value of syntax bbgf_quad_split_flag is 0, this indicates that the current block is split into 2 subblocks. On the other hand, when the value of the syntax bbgf_quad_split_flag is 1, this indicates that the current block is split into 4 subblocks. Further, when the value of bbgf_quad_split_flag is 1, the current block can be divided into 4 subblocks of the same size.

When the current block is divided into 2 subblocks, syntax for determining a split type of the current block may be additionally encoded/decoded. As an example, the syntax bbgf_split_orientation_flag indicates the split direction of the current block. When the syntax bbgf_split_orientation_flag is 0, this indicates that the current block is split in the horizontal direction. On the other hand, when the syntax bbgf_split_orientation_flag is 1, this indicates that the current block is split in the vertical direction.

The syntax bbgf_split_symmetry_flag indicates whether the current block is split in an asymmetric or symmetric form. As an example, when the syntax bbgf_split_symmetry_flag is 0, this indicates that the current block is asymmetrically split. When the current block is asymmetrically split, two subblocks obtained by splitting the current block may have different sizes. On the other hand, when bbgf_split_symmetry_flag is 1, this indicates that the current block is symmetrically split.

When the current block is asymmetrically split, the syntax bbgf_split_first_block_bigger may be additionally encoded/decoded. As an example, when the value of the syntax bbgf_split_first_block_bigger is 1, the size of the first subblock (i.e., the subblock bordering the left boundary or top boundary of the current block) may be set to be larger than the size of the second subblock (i.e., the subblock bordering the right boundary or bottom boundary of the current block). On the other hand, when the value of the syntax bbgf_split_first_block_bigger is 0, the size of the first subblock may be set to be smaller than the size of the second subblock.

FIG. 7 shows block split forms according to recursive split information of a block.

In Table 2, the syntax bbgf_max_number_of_splits[v] indicates a maximum number of splits (i.e., maximum split geometry) for the view with the index v. When the split geometry of a split block reaches the maximum split geometry indicated by the syntax bbgf_max_number_of_splits, encoding/decoding of information on the split structure for the block is skipped, and the block may no longer be split.

For leaf node blocks, geometry estimation information may be encoded/decoded. The geometry estimation information may include at least one piece of information indicating whether geometry estimation for a block is skipped, geometry prediction information, or geometry difference information.

As an example, the syntax bbgf_skip_flag in Table 2 indicates whether geometry estimation for the current block is skipped. When the value of the syntax bbgf_skip_flag is 0, this indicates that information for geometry estimation for the current block is explicitly encoded/decoded. Specifically, when the value of the syntax bbgf_skip_flag is 1, at least one of geometry prediction information or geometry difference information may be explicitly encoded/decoded for the current block. On the other hand, when the value of the syntax bbgf_skip_flag is 1, this indicates that geometry estimation for the current block is skipped. In this case, encoding/decoding of geometry prediction information and geometry difference information for the current block is skipped, and the geometry range of the current block may be set to be the same as the geometry range of the block at the same position as the current block in the previous frame. Here, the previous frame refers to a frame whose output order (i.e., display order) is 1 less than the current frame including the current block.

Meanwhile, geometry range prediction may be derived by referring to geometry ranges of neighboring blocks surrounding the current block. Specifically, the geometry range of a neighboring block around the current block may be set as a geometry range prediction value of the current block. Here, the neighboring block may include at least one of a top neighboring block, a left neighboring block, an upper left neighboring block, an upper right neighboring block, or a lower left neighboring block of the current block. In embodiments which will be described later, it is assumed that the geometry range prediction value of the current block is derived from one of the left neighboring block and the top neighboring block of the current block.

When there is a plurality of available neighboring blocks, information indicating one of the plurality of neighboring blocks may be encoded and signaled. Meanwhile, a geometry range is defined by minimum and maximum values. Accordingly, geometry prediction information may include prediction information on the minimum value of the geometry range and prediction information on the maximum value of the geometry range.

As an example, the syntax bbgf_ltmin_flag in Table 2 indicates the block used to derive a predicted value for the minimum value of the geometry range between the top neighboring block and the left neighboring block. Specifically, when the value of the syntax bbgf_ltmin_flag is 0, this indicates that the minimum value of the geometry range of the left neighboring block is set as a predicted value for the minimum value of the geometry range of the current block. On the other hand, when the value of the syntax bbgf_ltmin_flag is 1, this indicates that the minimum value of the geometry range of the top neighboring block is set as a predicted value for the minimum value of the geometry range of the current block.

In Table 2, the syntax bbgf_ltmax_flag indicates the block used to derive a predicted value for the maximum value of the geometry range between the top neighboring block and the left neighboring block. Specifically, when the value of the syntax bbgf_ltmax_flag is 0, this indicates that the maximum value of the geometry range of the left neighboring block is set as a predicted value for the maximum value of the geometry range of the current block. On the other hand, when the value of the syntax bbgf_ltmax_flag is 1, this indicates that the maximum value of the geometry range of the top neighboring block is set as a predicted value for the maximum value of the geometry range of the current block.

Likewise, geometry difference information may include difference information on the minimum value of a geometry range and difference information on the maximum value of the geometry range. As an example, in Table 2, the syntax bbgf_zmin_delta indicates a difference value for the minimum value of geometry information, and the syntax bbgf_zmax_delta indicates a difference value for the maximum value of the geometry information.

Instead of encoding/decoding a geometry information difference value as it is, a difference value quantized by a quantization parameter may be encoded/decoded and signaled. Accordingly, the geometry information difference value may be derived by multiplying the quantized difference value (i.e., syntax bbgf_zmin_delta or syntax bbgf_zmax_delta) by the quantization parameter (i.e., syntax bbgf_qs).

If at least one of the neighboring blocks around the current block is not available, encoding/decoding of the geometry information prediction value may be skipped.

As an example, in Table 2, the variables LTMinFlag and LTMaxFlag represent neighboring blocks used to derive a predicted value for the minimum value of the geometry range and a predicted value for the maximum value of the geometry range. These two variables may be derived depending on availability of the left neighboring block and the top neighboring block. As an example, if a neighboring block is outside a picture boundary, a slice boundary, or a tile boundary, the neighboring block may be determined to be unavailable.

Specifically, if both the left neighboring block and the top neighboring block of the current block are not available, the values of the variables LTMinFlag and LTMaxFlag are both set to 2. For example, when the current block is the first block in the current frame, both the top neighboring block and the left neighboring block are outside the picture boundary, and thus both the values of the variables LTMinFlag and LTMaxFlag can be set to 2. In this case, a predicted value for the minimum value of the geometry range and a predicted value for the maximum value of the geometry range of the current block may be set to default values. Here, a default value may be 0 or an integer expressed as an exponent of 2, such as 16, 32, 64, or the like. For the minimum value of the geometry range and the maximum value of the geometry range, the same default value may be set. Alternatively, different default values may be set for the minimum value of the geometry range and the maximum value of the geometry range.

If the top neighboring block of the current block is not available but the left neighboring block is available, both the values of the variables LTMinFlag and LTMaxFlag are set to 0. For example, if the current block borders the upper boundary of the current frame, both the values of the variables TMinFlag and LTMaxFlag are set to 0. In this case, a predicted value for the minimum value of the geometry range and a predicted value for the maximum value of the geometry range of the current block may be set as the minimum value of the geometry range and the maximum value of the geometry range of the left neighboring block.

If the left neighboring block of the current block is not available but the top neighboring block is available, both the values of the variables LTMinFlag and LTMaxFlag are set to 1. For example, if the current block borders the left boundary of the current frame, both the values of the variables LTMinFlag and LTMaxFlag are set to 1. In this case, a predicted value for the minimum value of the geometry range and a predicted value for the maximum value of the geometry range of the current block may be set as the minimum value of the geometry range and the maximum value of the geometry range of the top neighboring block.

If both the top neighboring block and the left neighboring block of the current block are available, the variables LTMinFlag and LTMaxFlag can be set to be the same as the syntax bbgf_ltmin_flag and syntax bbgf_ltmax_flag.

In summary, the minimum value Zmin of the geometry range and the maximum value Zmax of the geometry range of the current block can be derived by the following equations 3 and 4, respectively.

$$ZMin=(LTMinFlag==2?0:LTMinFlag==1?ZMinTop: ZMinLeft)+bbgf\_qs*bbgf\_zmin\_delta \qquad \text{[Equation 3]}$$

$$ZMax=(LTMaxFlag==2?0:LTMaxFlag==1?ZMinTop: ZMinLeft)+bbgf\_qs*bbgf\_zmax\_delta \qquad \text{[Equation 4]}$$

As described above, a video profile that skips encoding/decoding of geometry information and encodes/decodes assistance information for geometry estimation on the decoder side can be defined as an MIV GA (Geometry Absent) profile.

The present disclosure proposes an MIV DSDE profile (MIV Decoder-Side Depth Estimation Profile), which is distinguished from the MIV GA profile.

In a case where the MIV DSDE profile is applied, a bitstream is allowed to include partial or full depth information, unlike the MIV GA profile. Depth information included in a bitstream may contribute to improvement of depth estimation performance (e.g., depth estimation speed or depth estimation accuracy) on the decoder side. Specifically, the quality of a depth map can be improved by modifying/refining depth values transmitted through a bitstream.

Information representing a profile applied to the current image may be encoded and signaled. The information may be an index indicating one of predefined profiles. As an example, a syntax ptl_profile_toolset_idc indicating a profile applied to an image may be encoded and signaled.

FIG. 8 is a diagram illustrating an example in which a depth map is created/modified through depth estimation.

FIG. 8 shows an example in which depth estimation is applied to a view i and a view j.

When depth maps are not transmitted through bitstreams, a decoder may generate a depth map by performing depth estimation. In the example shown in FIG. 8(*a*), depth map encoding/decoding is skipped for both the view i and the view j, and accordingly, depth estimation is performed on the decoder side to create an estimated depth map for each of the view i and the view j.

When depth maps are transmitted for only some of a plurality of view images, depth map refinement may be performed through depth estimation for view images for which depth maps have been transmitted. On the other hand, for view images for which depth maps have not been transmitted, depth maps can be created through depth estimation. In the example shown in FIG. 8(*b*), the depth map is encoded/decoded for the view i, while depth map encoding/decoding is skipped for the view j. Accordingly, depth map refinement is performed for the view i through depth estimation, and the depth map for the view j is created through depth estimation. As in the example shown in FIG. 8(*b*), refinement of a transmitted depth map through depth estimation may be referred to as geometry assistance.

As another example, when depth maps are transmitted for only some of a plurality of view images, depth map refinement may be performed through depth estimation for view images for which depth maps have been transmitted. On the other hand, for view images for which depth maps have not been transmitted, the depth maps of the view images for which the depth maps have been transmitted may be reprojected (or warped) to match the view images for which depth maps have not been transmitted, and then refinement of the reprojected depth maps may be performed through depth estimation. In the example shown in FIG. 8(*c*), the depth map is encoded/decoded for the view i, while depth map encoding/decoding is skipped for the view j. Depth map refinement for the view i may be performed through depth estimation. Then, the depth map for the view i is reprojected to match the view j to generate a reprojected depth map, and the reprojected depth map is refined through depth estimation. As in the example shown in FIG. 8(*c*), refinement of a reprojected depth map through depth estimation may be referred to as extended geometry assistance.

The depth map of the view i which is reprojected to the view j may be a depth map before or after depth estimation is performed. Additionally, when the depth map of the view i is reprojected to the view j, an empty region may be present in the reprojected depth map. Through depth estimation, new depth values for the empty region can be generated.

As a result, an image can be rendered in a 3D space using at least one of a depth map generated through depth estimation, a depth map refined through depth estimation, or a reprojected depth map refined through depth estimation.

Meanwhile, in a case where geometry assistance or extended geometry assistance is applied, a depth map can be encoded/decoded only for a basic view. That is, depth map refinement is performed through depth estimation for the basic view, whereas a new depth map is created through depth estimation or refinement of a depth map reprojected from the basic view to an additional view is performed through depth estimation for the additional view.

To apply the MIV DSDE profile, the decoder may additionally encode/decode information indicating whether motion estimation is performed. Table 3 shows the syntax structure containing this information.

TABLE 3

| | Descriptor |
|---|---|
| casps_miv_extension( ) { | |
|     casme_depth_low_quality_flag | u(1) |
|     casme_depth_quantization_params_present_flag | u(1) |
|     casme_vui_params_present_flag | u(1) |
|     casme_decoder_side_depth_estimation_flag | u(1) |
|     if( casme_vui_params_present_flag ) | |
|         vui_parameters( ) | |
| } | |

In Table 3, the syntax casme_decoder_side_depth_estimation_flag indicates whether the decoder needs to estimate or re-estimate depth information. For example, when the value of casme_decoder_side_depth_estimation_flag is 1, this indicates that the decoder needs to estimate or re-estimate the depth information. On the other hand, when the value of the syntax casme_decoder_side_depth_estimation_flag is 0, this indicates that transmitted depth information is not re-estimated. If the syntax casme_decoder_side_depth_estimation_flag is not present, the value of the syntax can be inferred to be 0.

When the syntax casme_decoder_side_depth_estimation_flag is 0, a depth map for a specific view may be set as a depth map encoded/decoded through a bitstream or a depth map generated by reprojecting the depth map.

In Table 3, the syntax casme_decoder_side_depth_estimation_flag is illustrated as being included in the Common Atlas Sequence Parameter Set (CASPS). In addition to the above example, information indicating whether the decoder needs to estimate or re-estimate depth information may be signaled through a video parameter set, a picture header, or a slice header.

When the decoder estimates or re-estimates depth information (i.e., when the value of casme_decoder_side_depth_estimation_flag is 1), information for performing depth information estimation or re-estimation on the decoder side may be additionally encoded/decoded. Table 4 shows a structure including syntaxes for performing depth information estimation or re-estimation on the decoder side.

TABLE 4

| | Descriptor |
|---|---|
| miv_view_params_list( ) { | |
|   mvp_num_views_minus1 | u(16) |
|   mvp_explicit_view_id_flag | u(1) |
|   if( mvp_explicit_view_id_flag ) | |
|     for( v = 0; v <= mvp_num_views_minus1; v++ ) | |
|       mvp_view_id[ v ] | u(16) |
|     for( v = 0; v <= mvp_num_views_minus1; v++ ) { | |
|       camera_extrinsics( v ) | |
|       mvp_inpaint_flag[ v ] | u(1) |
|     } | |
|   mvp_intrinsic_params_equal_flag | u(1) |
|   for( v = 0; v <= mvp_intrinsic_params_equal_flag ? 0 : mvp_num_views_minus1; v++ ) | |
|     camera_intrinsics( v ) | |
|     if( casme_depth_quantization_params_present_flag ) { | |
|       mvp_depth_quantization_params_equal_flag | u(1) |
|       for( v = 0; v <= mvp_depth_quantization_equal_flag ? 0 : mvp_num_views_minus1; v++ ) | |
|         depth_quantization( v ) | |
|     } | |
|   mvp_pruning_graph_params_present_flag | u(1) |
|   if ( mvp_pruning_graph_params_present_flag ) | |
|     for( v = 0; v <= mvp_num_views_minus1; v++ ) | |
|       pruning_parents( v ) | |
|   if( casme_decoder_side_depth_estimation_flag ) { | |
|     mvp_reestimate_all_geometry_flag | u(1) |
|     mvp_do_the_reprojection_flag | u(1) |
|     if( mvp_reestimate_all_geometry_flag == 0) { | |
|       for( v = 0; v <= mvp_num_views_minus1; v++ ) { | |
|         mvp_keep_transmitted_geometry_flag[ v ] | u(1) |
|         mvp_keep_reprojected_geometry_flag[ v ] | u(1) |
|       } | |
|     } | |
|   } | |
| } | |

In Table 4, the syntax mvp_reestimate_all_geometry_flag indicates whether depth values need to be estimated or re-estimated for all view images. As an example, when the value of the syntax mvp_reestimate_all_geometry_flag is 1, this indicates that depth estimation or re-estimation is performed on all depth values (i.e., all view images) through a depth estimation process. On the other hand, when the value of the syntax mvp_reestimate_all_geometry_flag is 0, this indicates that depth estimation or re-estimation is not performed for all depth values (i.e., all view images).

When depth estimation or re-estimation is not performed for all depth values (i.e., when the value of the syntax mvp_reestimate_all_geometry_flag is 0), information for determining a view image on which depth estimation or re-estimation will be performed may be additionally encoded/decoded.

The syntax mvp_do_the_reprojection_flag indicates whether depth data is generated by reprojecting transmitted depth values for all view images before the decoder performs the depth estimation process. For example, when the syntax mvp_do_the_reprojection_flag is 1, this indicates that the decoder generates depth data by reprojecting transmitted depth values for all view images before performing the depth estimation process. As an example, if the syntax mvp_do_reprojection_flag is 1 and the depth map is encoded/decoded only for the basic view, depth estimation for an additional view may be performed on a reprojected depth map generated by reprojecting the depth map of the basic view.

On the other hand, when the syntax mvp_do_the_reprojection_flag is 0, this indicates that the process of generating depth data through reprojection is not performed before the depth estimation process.

The syntax mvp_keep_transmitted_geometry_flag[v] indicates whether depth estimation or re-estimation is performed for a view image with an index v. For example, when the syntax mvp_keep_transmitted_geometry_flag[v] is 1, this indicates that depth estimation or re-estimation is not performed for the view image with the index v. That is, when the syntax mvp_keep_transmitted_geometry_flag[v] is 1, a transmitted depth value is not modified for the view image with the index v. When the syntax mvp_keep_transmitted_geometry_flag[v] is 0, this indicates that depth estimation or re-estimation is performed on the view image with the index of v. That is, when the syntax mvp_keep_transmitted_geometry_flag[v] is 0, a depth value transmitted through the depth estimation process may be modified for the view image with the index v.

The syntax mvp_keep_reprojected_geometry_flag[v] indicates whether to modify depth data generated through reprojection for the view image with index v. For example, when the syntax mvp_keep_reprojected_geometry_flag[v] is 1, this indicates that a reprojected depth value is not modified for the view image with the index v during the depth estimation process. On the other hand, when the syntax mvp_keep_reprojected_geometry_flag[v] is 0, this indicates that the reprojected depth value is modified for the view image with the index v during the depth estimation process.

When the mvp_do_reprojection_flag is 0, the syntax mvp_keep_projected_geometry_flag[v] can be encoded/decoded only when the syntax mvp_do_reprojection_flag is 1.

Table 4 shows an example in which the syntax mvp_keep_transmitted_geometry_flag[v] that indicates whether a transmitted depth value is modified and the syntax mvp_keep_reprojected_geometry_flag[v] that indicates whether a reprojected depth value is modified are encoded/decoded for each view image.

Unlike the example, it is also possible to encode/decode information indicating the number of view images for which transmitted depth values and/or reprojected depth values are modified and information for identifying the view images (e.g., a view image index).

Table 5 shows ranges of values of syntaxes for each profile.

TABLE 5

| Syntax element | Profile name | | | | |
| --- | --- | --- | --- | --- | --- |
| | MIV Main | MIV Extended | MIV Extended Restricted Geometry | MIV Geometry Absent | MIV DSDE |
| vuh_unit_type | V3C_VPS, V3C_AD, V3C_GVD, V3C_AVD, or V3C_CAD | V3C_VPS, V3C_AD, V3C_OVD, V3C_GVD, V3C_AVD, V3C_PVD, or V3C CAD | V3C_VPS, V3C_AD, V3C_AVD, V3C_PVD, or V3C CAD | V3C_VPS, V3C_AD, V3C_AVD, V3C_PVD, or V3C CAD | V3C_VPS, V3C_AD, V3C_OVD, V3C_AVD, V3C_GVD, V3C_PVD, or V3C CAD |
| ptl_profile_toolset_idc | 64 | 65 | | 66 | 67 |
| ptl_profile_reconstruction_idc | 255 | 255 | | 255 | 255 |
| ptc_restricted_geometry_flag | — | 0 | 1 | — | — |
| vps_miv_extension_present_flag | 1 | 1 | 1 | 1 | 1 |
| vps_packing_information_present_flag | 0 | 0, 1 | 0, 1 | 0, 1 | 0, 1 |

TABLE 5-continued

| Syntax element | MIV Main | MIV Extended | MIV Extended Restricted Geometry | MIV Geometry Absent | MIV DSDE |
|---|---|---|---|---|---|
| | | | Profile name | | |
| vps_map_count_minus1[ atlasID ] | 0 | 0 | 0 | 0 | 0 |
| vps_occupancy_video_present_flag[ atlasID ] | 0 | 0, 1 | 0 | 0 | 0, 1 |
| vps_geometry_video_present_flag[ atlasID ] | 1 | 0, 1 | 0 | 0 | 0, 1 |
| vme_embedded_oc-_cupancy_enabled_flag | 1 | 0, 1 | 0 | 0 | 0, 1 |
| casme_decoder_side_depth_estimation_flag | 0 | 0 | 0 | 1 | 1 |
| mvp_reestimate_all_geometry_flag | — | — | — | 1 | 0, 1 |
| gi_geometry_MSB_align_flag[ atlasID ] | 0 | 0 | 0 | 0 | 0 |
| ai_attribute_count [ atlasID ] | 0, 1 | 0, 1, 2 | 2 | 0, 1 | 0, 1 |
| ai_attribute_type_id [ atlasID ][ attrIdx ] | ATTR_TEXTURE | ATTR_TEXTURE, ATTR_TRANSPARENCY | ATTR_TEXTURE, ATTR_TRANSPARENCY | ATTR_TEXTURE | ATTR_TEXTURE |
| ai_attribute_dimension_minus1[ atlasID ] [ attrTextureIdx ] | 2 | 2 | 2 | 2 | 2 |
| ai_attribute_dimension_minus1[ atlas ID ] [ attrTransparencyIdx ] | — | 0 | 0 | — | — |
| ai_attribute_dimension_partitions_minus1 [ atlasID ] [ attrIdx ] | 0 | 0 | 0 | 0 | 0 |
| ai_attribute_MSB_align_flag[ atlasID ] [ attrIdx ] | 0 | 0 | 0 | 0 | 0 |
| asps_long_term_ref_atlas_frames_flag | 0 | 0 | 0 | 0 | 0 |
| asps_pixel_deinterleaving_enabled_flag | 0 | 0 | 0 | 0 | 0 |
| asps_patch_precedence_order_flag | 0 | 0 | 0 | 0 | 0 |
| asps_raw_patch_enabled_flag | 0 | 0 | 0 | 0 | 0 |
| asps_eom_patch_enabled_flag | 0 | 0 | 0 | 0 | 0 |
| asps_plr_enabled_flag | 0 | 0 | 0 | 0 | 0 |
| asme_patch_constant_depth_flag_ | 0 | 0, 1 | 1 | 0, 1 | 0, 1 |
| vps_geometry_video_present_flag[ atlasID ] \|\| asme_patch_constant_depth_flag | — | 1 | 1 | 0, 1 | 0, 1 |
| vps_packed_video_present_flag[ atlasID ] | 0 | 0, 1 | 0, 1 | 0, 1 | 0, 1 |
| afps_lod_mode_enabled_flag | 0 | 0 | 0 | 0 | 0 |
| afps_raw_3d_pos_bit_count_explicit_mode_flag | 0 | 0 | 0 | 0 | 0 |
| afti_single_tile_in_atlas_frame_flag | 1 | 0, 1 | 0, 1 | 0, 1 | 0, 1 |

TABLE 5-continued

| | Profile name | | | | |
|---|---|---|---|---|---|
| Syntax element | MIV Main | MIV Extended | MIV Extended Restricted Geometry | MIV Geometry Absent | MIV DSDE |
| ath_type | I_TILE | I_TILE | I_TILE | I_TILE | I_TILE |
| atdu_patch_mode [ tileID ][ patchIdx ] | I_INTRA | I_INTRA | I_NTRA I | I_INTRA | I_INTRA |
| asps_atlas_sequence_parameter_set_id | 0 . . . 63, inclusive | 0 . . . 63, inclusive | 0 . . . 63, inclusive | 0 . . . 63, inclusive | 0 . . . 63, inclusive |
| afps_atlas_frame_parameter_set_id | 0 . . . 63, inclusive | 0 . . . 63, inclusive | 0 . . . 63, inclusive | 0 . . . 63, inclusive | 0 . . . 63, inclusive |
| afps_atlas_sequence_parameter_set_id | 0 . . . 63, inclusive | 0 . . . 63, inclusive | 0 . . . 63, inclusive | 0 . . . 63, inclusive | 0 . . . 63, inclusive |
| aaps_atlas_adaptation_parameter_set_id | 0 . . . 63, inclusive | 0 . . . 63, inclusive | 0 . . . 63, inclusive | 0 . . . 63, inclusive | 0 . . . 63, inclusive |
| ath_atlas_frame_parameter_set_id | 0 . . . 63, inclusive | 0 . . . 63, inclusive | 0 . . . 63, inclusive | 0 . . . 63, inclusive | 0 . . . 63, inclusive |
| ath_atlas_adaptation_parameter_set_id | 0 . . . 63, inclusive | 0 . . . 63, inclusive | 0 . . . 63, inclusive | 0 . . . 63, inclusive | 0 . . . 63, inclusive |

In the example of Table 5, index 66 is assigned to the MIV GA profile, and index 67 is assigned to the MIV DSDE profile. In the MIV GA and MIV DSDE profiles in which depth estimation is performed on the decoder side, the value of the syntax casme_decoder_side_depth_estimation_flag can be set to 1.

In the MIV GA profile in which depth values are not encoded/decoded through bitstreams, the value of the syntax mvp_reestimate_all_geometry_flag is set to 1. On the other hand, in the MIV DSDE profile that allows partial encoding/decoding of depth values through bitstreams, the value of the syntax mvp_reestimate_all_geometry_flag can be set to either 0 or 1.

In the MIV GA profile, depth values are not encoded/decoded through bitstreams. Accordingly, when the MIV GA profile is applied, the decoder needs to restore all depth values through depth estimation, and accordingly, the amount of computation of the decoder increases. Accordingly, it is difficult to apply the MIV GA profile to real-time services.

On the other hand, in the MIV DSDE profile, depth values can be encoded/decoded through bitstreams. Accordingly, when the MIV GA profile is applied, the amount of computation of the decoder is reduced as compared to the MIV GA profile. Accordingly, MIV DSDE can also be applied to real-time services.

According to the present disclosure, it is possible to reduce the amount of geometric information to be encoded/decoded through depth estimation on a decoder side.

According to the present disclosure, it is possible to provide a profile that allows depth estimation to be performed on the decoder side and a syntax structure according thereto.

What is claimed is:

1. A method of encoding a video, the method comprising:
classifying a plurality of view images into a basic image and additional images;

performing pruning on at least one of the plurality of view images on the basis of the classification result;
generating an atlas on the basis of the pruning result; and
encoding the atlas and metadata for the atlas,
wherein the metadata includes a first flag indicating whether depth estimation needs to be performed on a decoder side,
wherein in response to the first flag being encoded with a value indicating that the depth estimation needs to be performed on the decoder side, a second flag indicating whether a depth values are reprojected before the depth estimation is further included in the metadata,
wherein in response to the second flag is encoded to indicate that the depth values are to be reprojected, the depth values for the depth estimation are further encoded,
wherein depth values for each view image where the depth estimation is performed are obtained by reprojecting the depth values to be encoded, and
wherein the depth estimation for each view image is performed in units of blocks.

2. The method of claim 1, wherein the metadata further includes identification information for identifying a profile of the video, and
wherein, in response to the profile of the video indicating MIV (MPEG Immersive Video) GA (Geometry Absent), the atlas is constituted with only a texture component without a depth component.

3. The method of claim 2, wherein in response to the profile of the video being the MIV GA, the first flag is encoded with the value indicating that the depth estimation needs to be performed on the decoder side.

4. The method of claim 3, wherein in response to the profile of the video being other than the MIV GA, the atlas is constituted with the texture component and the depth component.

5. The method of claim 4, wherein the metadata further includes a third flag indicating whether depth estimation is performed on all view images.

6. The method of claim 5, wherein the third flag is encoded with a value indicating that the depth estimation is performed on the all view images when the profile of the video is the MIV GA.

7. A method of decoding a video, the method comprising:
decoding an atlas and metadata for the atlas; and
generating a viewport image using the atlas and the metadata,
wherein the metadata includes a first flag indicating whether depth estimation needs to be performed on a decoder side,
wherein in response to the first flag indicating that the depth estimation needs to be performed on the decoder side, a second flag indicating whether transmitted depth values are reprojected before the depth estimation is further included in the metadata,
wherein, in response to the second flag indicating that the transmitted depth values are reprojected, the transmitted depth values are reprojected for each view image where the depth estimation is performed, and
wherein the depth estimation for each view image is performed in units of blocks.

8. The method of claim 7, wherein the metadata further includes identification information for identifying a profile of the video, and,
wherein, in response to the profile of the video indicating MIV GA, the atlas is constituted with only a texture component without a depth component.

9. The method of claim 8, wherein in response to the profile of the video being the MIV GA, the value of the first flag is forced to indicate that the depth estimation needs to be performed on the decoder side.

10. The method of claim 8, wherein in response to the profile of the video being other than the MIV GA, the atlas is constituted with the texture component and the depth component.

11. The method of claim 8, wherein the second flag is forced to indicate that the depth estimation is performed on the all view images when the profile of the video is the MIV GA.

12. The method of claim 7, wherein a depth map of a first view reconstructed from a depth component of the atlas is refined by performing the depth estimation at the decoder side.

13. The method of claim 12, wherein a depth map of a second view is obtained by refining a reprojected depth map generated by reprojecting the depth map or a refined depth map of the first view.

14. The method of claim 7, wherein the metadata further includes a third flag indicating whether depth estimation is performed on all view images.

15. A non-transitory computer-readable recording medium storing instructions for carrying out encoding of a video, the instructions comprising:
classifying a plurality of view images into a basic image and additional images;
performing pruning on at least one of the plurality of view images on the basis of the classification result;
generating an atlas on the basis of the pruning result; and
encoding the atlas and metadata for the atlas,
wherein the metadata includes a first flag indicating whether depth estimation needs to be performed on a decoder side,
wherein in response to the first flag being encoded with a value indicating that the depth estimation needs to be performed on the decoder side, a second flag indicating whether depth values are reprojected before the depth estimation or not is further included in the metadata,
wherein in response to the second flag is encoded to indicate that the depth values are to be reprojected, the depth values for the depth estimation are further encoded,
wherein depth values for each view image where the depth estimation is performed are obtained by reprojecting the depth values to be encoded, and
wherein the depth estimation for each view image is performed in units of blocks.

* * * * *